(12) United States Patent
Yamanaka

(10) Patent No.: US 12,697,862 B2
(45) Date of Patent: Aug. 4, 2026

(54) VEHICLE

(71) Applicant: TOYOTA JIDOSHA KABUSHIKI KAISHA, Toyota (JP)

(72) Inventor: Atsushi Yamanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 18/652,295

(22) Filed: May 1, 2024

(65) Prior Publication Data

US 2024/0383324 A1 Nov. 21, 2024

(30) Foreign Application Priority Data

May 17, 2023 (JP) ................................ 2023-081346

(51) Int. Cl.
| | |
|---|---|
| *B60K 1/04* | (2019.01) |
| *B62D 21/15* | (2006.01) |
| *B62D 25/20* | (2006.01) |

(52) U.S. Cl.
CPC ................ *B60K 1/04* (2013.01); *B62D 21/15* (2013.01); *B62D 25/20* (2013.01)

(58) Field of Classification Search
CPC .............. B60K 1/04; B60K 2001/0438; B60K 2001/005; H01M 50/249; H01M 2220/20; B60L 50/66; B62D 25/20; B62D 21/15
USPC ...................................................... 180/68.5
See application file for complete search history.

(56) References Cited

U.S. PATENT DOCUMENTS

| | | | | |
|---|---|---|---|---|
| 11,628,714 | B2 * | 4/2023 | Caliskan ................. | B60K 1/04 |
| | | | | 180/68.5 |
| 11,772,473 | B2 * | 10/2023 | Suewaka ............. | H01M 6/5038 |
| | | | | 429/120 |
| 12,220,980 | B2 * | 2/2025 | Lee .......................... | B60K 1/04 |
| 2017/0305250 | A1 * | 10/2017 | Hara ................... | H01M 50/204 |
| 2021/0402861 | A1 * | 12/2021 | Aitharaju ............... | B60L 50/64 |
| 2022/0063389 | A1 * | 3/2022 | Suewaka ............. | H01M 50/204 |
| 2023/0322306 | A1 * | 10/2023 | Janarthanam ........ | B62D 29/007 |
| | | | | 296/187.08 |
| 2024/0097256 | A1 * | 3/2024 | Sonobe ................... | B60K 1/04 |
| 2024/0158013 | A1 * | 5/2024 | Zhao ..................... | B62D 29/04 |

FOREIGN PATENT DOCUMENTS

| | | |
|---|---|---|
| JP | 2017-226353 A | 12/2017 |
| JP | 2022-038256 A | 3/2022 |
| WO | 2022/124335 A1 | 6/2022 |

* cited by examiner

*Primary Examiner* — James A Shriver, II
*Assistant Examiner* — Hilary L Johns
(74) *Attorney, Agent, or Firm* — Oliff PLC

(57) ABSTRACT

A vehicle is provided with a shock absorber arranged along a side of a housing space for a battery pack of the vehicle, and a reinforcing member for reinforcing a lower surface of an enclosure of the battery pack of the vehicle, the reinforcing member being disposed at a bottom of the housing space for the battery pack of the vehicle, in which the reinforcing member has a section protruding from the housing space for the battery pack, the side surface of the reinforcing member is brought into contact with the side surface of the shock absorber, and the upper surface of the reinforcing member is brought into contact with the lower surface of the shock absorber.

6 Claims, 3 Drawing Sheets

103

101

VEHICLE

CROSS REFERENCE TO RELATED APPLICATIONS

This application is based upon and claims the benefit of priority from Japanese patent application No. 2023-81346, filed on May 17, 2023, the disclosure of which is incorporated herein in its entirety by reference.

BACKGROUND

The present disclosure relates to a vehicle.

A vehicle having a configuration in which the load imposed on a side surface of the vehicle in the event of vehicle collision is absorbed is being developed. The vehicle body described in Japanese Unexamined Patent Application Publication No. 2017-226353 is equipped with a battery pack installed below the floor panel and a side sill extended in the front-rear direction of the vehicle on the outer side of the vehicle body in the vehicle width direction. A shock absorber is arranged in the cross section of the side sill. The shock absorber is provided with a load bearing part that extends vertically, an upper shock absorbing part extending from the upper part of the load bearing part in the vehicle width direction, and a lower shock absorbing part extending from the bottom part of the load bearing part in the vehicle width direction. A floor cross member is arranged on the inner side of the upper shock absorbing part in the vehicle width direction. A battery cross member supporting a battery pack is arranged on the inner side of the lower shock absorbing part in the vehicle width direction.

SUMMARY

Since the vehicle body described in Japanese Unexamined Patent Application Publication No. 2017-226353 has a lower configuration in which there is a gap between the battery cross member and the lower shock absorbing part, there is a possibility that the shock absorber rotates, and the shock propagates to the battery pack. Therefore, an object of the present disclosure is to provide a vehicle that can let the shock imposed on the shock absorber be bypassed to a reinforcing member disposed at the bottom part of the battery pack when a shock is imposed on the shock absorber.

According to the present disclosure, a vehicle includes:

a shock absorber arranged along a side of a housing space for a battery pack of the vehicle; and a reinforcing member for reinforcing a lower surface of an enclosure of the battery pack of the vehicle, the reinforcing member being disposed at a bottom of the housing space for the battery pack of the vehicle, wherein a side surface of the reinforcing member, an upper surface of the reinforcing member, a side surface of the shock absorber, and a lower surface of the shock absorber are defined by top, bottom and sides of the vehicle, the reinforcing member has a section protruding from the housing space for the battery pack, the side surface of the reinforcing member is brought into contact with the side surface of the shock absorber, and the upper surface of the reinforcing member is brought into contact with the lower surface of the shock absorber.

With the above configuration, it is possible to provide a vehicle that can let the shock imposed on a shock absorber be bypassed to a reinforcing member disposed at the bottom part of the battery pack when a shock is imposed on the shock absorber.

The vehicle according to the present disclosure is configured such that the upper surface of the reinforcing member is fastened to the lower surface of the shock absorber by means of a fastening member.

With the above configuration, the reinforcing member is firmly fixed to the shock absorber.

The vehicle according to the present disclosure is configured such that the reinforcing member comprises a first reinforcing member and a second reinforcing member.

With the aforementioned configuration, the strength of the reinforcing member is increased.

The vehicle according to the present disclosure is configured such that the reinforcing member lets a load imposed on the shock absorber and then onto the battery pack be bypassed from the shock absorber to the reinforcing member.

With the above configuration, the reinforcing member lets the load imposed on the shock absorber and then onto the battery pack be bypassed from the shock absorber to the reinforcing member.

The vehicle according to the present disclosure is configured such that the reinforcing member has a corrugated structure along the vehicle in the front-rear direction of the vehicle.

With the above configuration, it is possible to increase the strength of the reinforcing member against the shock imposed on the side surface of the vehicle.

The present disclosure provides a vehicle which can let the shock imposed on the shock absorber be bypassed to a reinforcing member disposed at the bottom part of a battery pack when a shock is imposed on the shock absorber.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments

Figure 1:
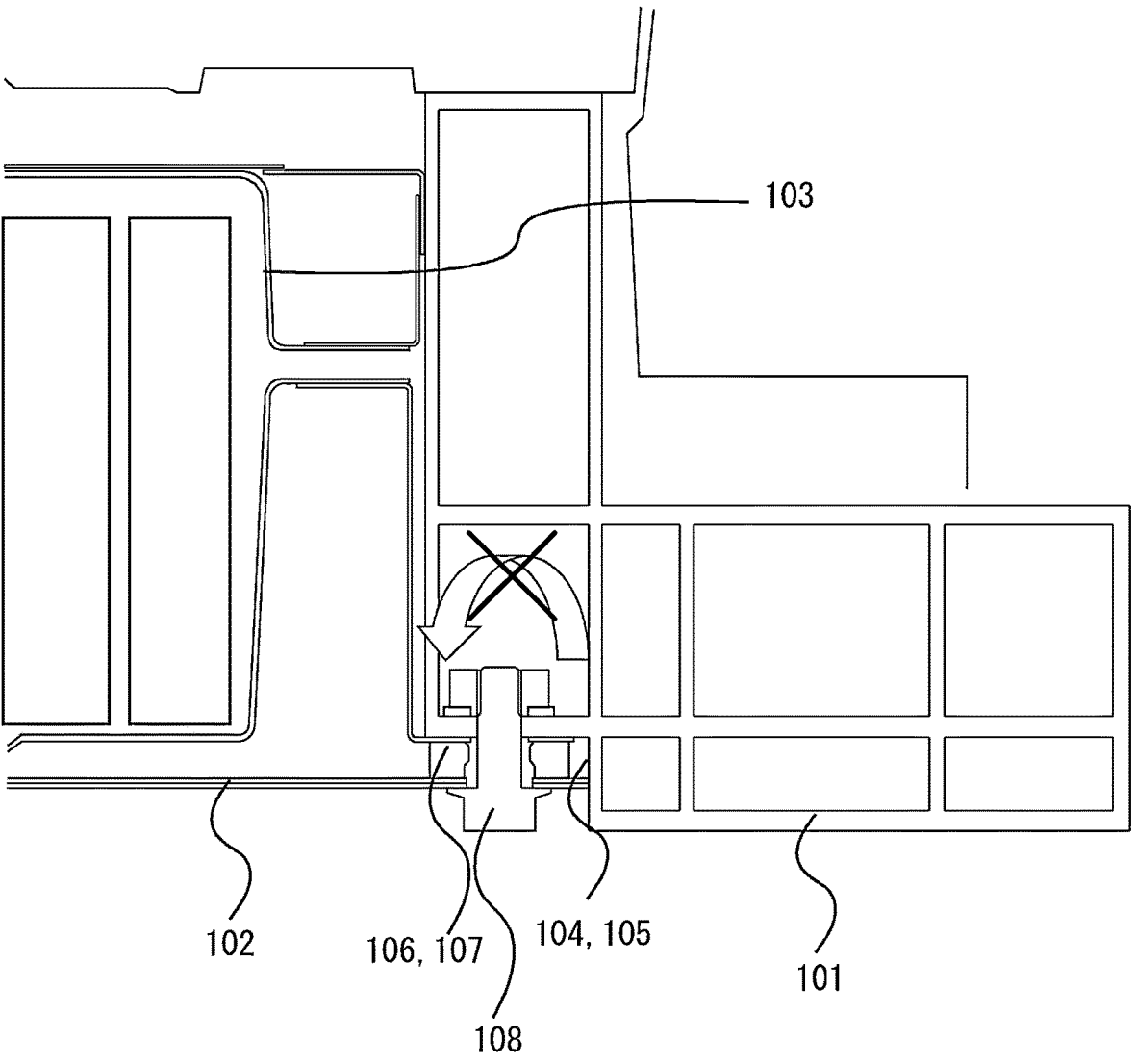
FIG. 1 is a cross-sectional view of a configuration of a bottom part of a vehicle according to an embodiment.

Hereinafter, embodiments of the present disclosure will be described with reference to the drawings. However, the claimed invention is not limited to the following embodiments. Moreover, not all of the configurations described in the embodiments are essential as means for solving the problem. For the sake of clarity, the following descriptions and drawings have been omitted and simplified as appropriate. In each drawing, the same elements are given the same reference numerals, and duplicate descriptions are omitted where necessary.

(Description of Configuration of Bottom Part of Vehicle According to Embodiment)

Figure 2:
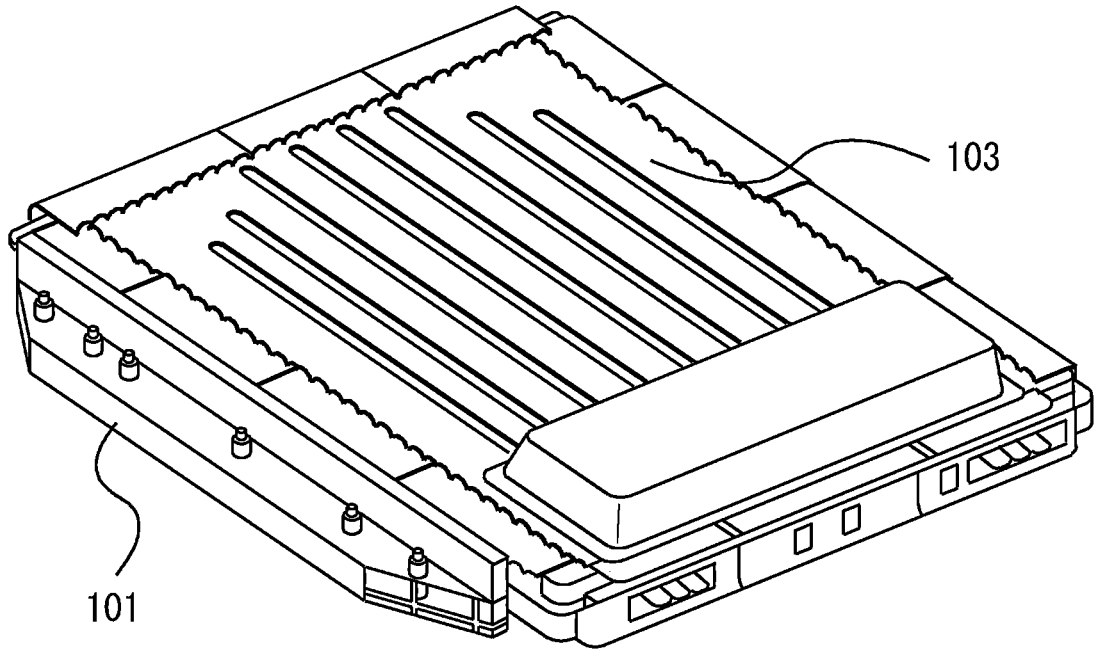
FIG. 2 is a schematic perspective view of a battery pack, a shock absorber, and a reinforcing member according to the embodiment.

FIG. 1 is a cross-sectional view of a configuration of a bottom part of a vehicle according to an embodiment. FIG. 2 is a schematic diagram of a battery pack, a shock absorber, and a reinforcing member according to the embodiment. The configuration of the bottom part of the vehicle according to the embodiment will be described with reference to FIGS. 1 and 2. Here, a vehicle refers to, for example, an electric vehicle powered by electricity or a hybrid vehicle powered by electricity and fossil fuels.

As shown in FIG. 1, the bottom part of a vehicle includes a shock absorber 101, a reinforcing member 102, and a battery pack 103. The shock absorber 101 is fastened by means of the reinforcing member 102 and a fastening member 108.

As shown in FIG. 1, the shock absorber 101 is disposed inside the vehicle on the lower part and the side surface thereof. The shock absorber 101 is deformed when a shock in imposed on the side surface of the vehicle in the event of vehicle collision or the like to thereby protect the internal configuration of the vehicle. As shown in FIG. 2, the shock absorber 101 according to the embodiment is arranged along the side of a housing space for a battery pack to thereby protect the battery pack 103 and is deformed when a shock is imposed on the side surface of the vehicle.

As shown in FIG. 1, the reinforcing member 102 is a member that reinforces the enclosure of the battery pack 103 from the lower surface side of the vehicle. Therefore, the reinforcing member 102 is disposed at the bottom of the housing space for the battery pack 103. A section of the reinforcing member 102 protrudes from the housing space for the battery pack 103.

The battery pack 103 is a power source for driving a vehicle. The battery pack 103 is disposed at the center of the vehicle in the bottom part thereof. The battery pack 103 is disposed at the center of the vehicle in the bottom part thereof whereby it is possible to provide stability and safety of the vehicle's center of gravity.

Here, a side surface 104 of the shock absorber, a side surface 105 of the reinforcing member, a lower surface 106 of the shock absorber, and an upper surface 107 of the reinforcing member are defined by top, bottom, and sides of the vehicle.

The side surface 105 of the reinforcing member has a section that is brought into contact with the side surface 104 of the shock absorber. Further, the upper surface 107 of the reinforcing member has a section that is brought into contact with the lower surface 106 of the shock absorber. With this configuration, even when a shock is imposed on the side surface of a vehicle, the shock absorber 101 does not rotate and stress is transmitted to the reinforcing member 102. Therefore, it is possible to let the load imposed on the shock absorber 101 and then onto the battery pack 103 be bypassed from the shock absorber 101 to the reinforcing member 102.

The upper surface 107 of the reinforcing member is fastened to the lower surface 106 of the shock absorber by means of the fastening member 108. The fastening member 108 includes, for example, a bolt and a nut. In this manner, the reinforcing member 102 is firmly fixed to the shock absorber 101.

(Explanation of Reinforcing Member According to Embodiment)

Figure 3:
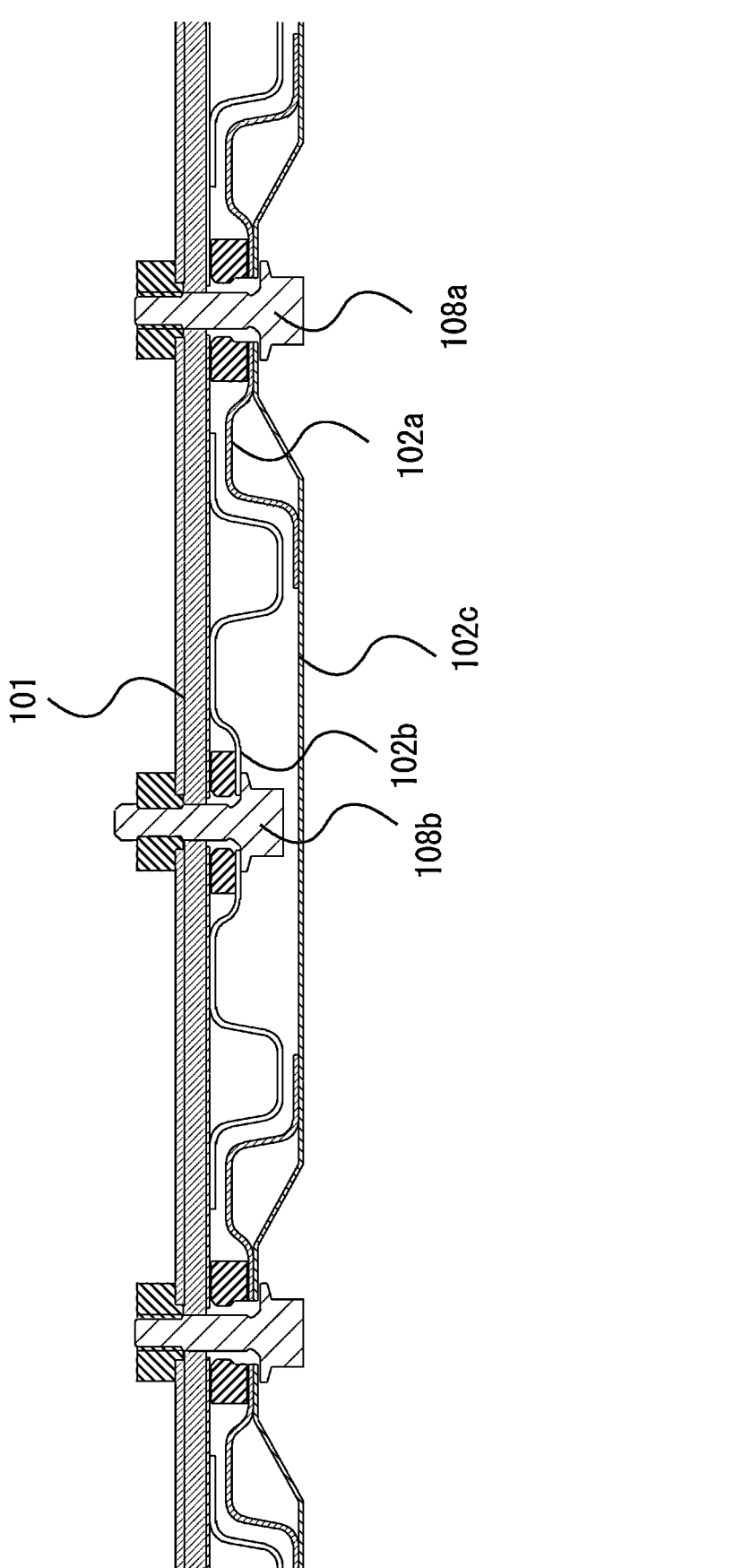
FIG. 3 is a schematic view of a reinforcing member and a fastening member viewed from the side-surface side of the vehicle according to the embodiment.

FIG. 3 is a schematic view of a reinforcing member and a fastening member viewed from the side surface of the vehicle according to the embodiment. The reinforcing member according to the embodiment will be described with reference to FIG. 3.

As shown in FIG. 3, the reinforcing member 102 according to the embodiment consists of a first reinforcing member 102a, a second reinforcing member 102b, and a third reinforcing member 102c. As shown in FIG. 3, the first reinforcing member 102a and the second reinforcing member 102b have a corrugated structure along the vehicle in the front-rear direction of the vehicle. With such a configuration, it is possible to increase the strength of the reinforcing member 102 against the shock imposed on the side surface of the vehicle. Also, the third reinforcing member 102c is arranged to form an outer shape of the lower surface of the reinforcing member 102.

The first reinforcing member 102a is fastened to the shock absorber 101 by means of a first fastening member 108a. Further, the second reinforcing member 102b is fastened to the shock absorber 101 by means of a second fastening member 108b. The third reinforcing member 102c is fastened to the shock absorber 101 by means of the first fastening member 108a. In such a configuration, the first reinforcing member 102a, the second reinforcing member 102b, and the third reinforcing member 102c are firmly fixed to the shock absorber 101.

The first fastening member 108a and the second fastening member 108b are bolts and nuts, for example. The nuts are arranged on the shock absorber-side, but the installation positions of the bolts and the nuts may be interchanged. The installation positions of the bolts and the nuts may be determined according to the assembly work of the vehicle so that the assembly work is facilitated.

It should be noted that present disclosure is not limited to the above embodiments and may be suitably changed to the extent that it does not deviate from the purpose.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicle comprising:
   a shock absorber arranged along a side of a housing space for a battery pack of the vehicle; and
   a reinforcing member for reinforcing a lower surface of an enclosure of the battery pack of the vehicle, the reinforcing member being disposed at a bottom of the housing space for the battery pack of the vehicle, wherein
   a side surface of the reinforcing member, an upper surface of the reinforcing member, a side surface of the shock absorber, and a lower surface of the shock absorber are defined by top, bottom and sides of the vehicle,
   the reinforcing member has a section protruding from the housing space for the battery pack,
   the side surface of the reinforcing member is brought into contact with the side surface of the shock absorber,
   the upper surface of the reinforcing member is brought into contact with the lower surface of the shock absorber,
   the reinforcing member comprises a first reinforcing member and a second reinforcing member,
   the first reinforcing member has a corrugated structure along the vehicle in a front-rear direction of the vehicle, the second reinforcing member has a corrugated structure along the vehicle in the front-rear direction of the vehicle, and a shape of the first reinforcing member is different from a shape of the second reinforcing member.

2. The vehicle according to claim 1, wherein the upper surface of the reinforcing member is fastened to the lower surface of the shock absorber by a fastening member.

3. The vehicle according to claim 1, wherein the reinforcing member lets a load imposed on the shock absorber and then onto the battery pack be bypassed from the shock absorber to the reinforcing member.

4. The vehicle according to claim 1, wherein the reinforcing member further comprises a third reinforcing member, and the third reinforcing member forms an external shape of a lower surface of the reinforcing member.

5. The vehicle according to claim 4, wherein the first reinforcing member is fastened to the shock absorber by a first fastening member, the second reinforcing member is fastened to the shock absorber by a second fastening member, and the third reinforcing member is fastened to the shock absorber by the first fastening member.

6. The vehicle according to claim 4, wherein extending along the front-rear direction of the vehicle:

a first portion of the third reinforcing member overlaps with a first portion of the first reinforcing member and overlaps with no portion of the second reinforcing member, a second portion of the third reinforcing member which is adjacent to the first portion of the third reinforcing member overlaps with a second portion of the first reinforcing member and overlaps with a first portion of the second reinforcing member, and a third portion of the third reinforcing member which is adjacent to the second portion of the third reinforcing member overlaps with a second portion of the second reinforcing member and overlaps with no portion of the first reinforcing member.

\* \* \* \* \*